(12) United States Patent
Okuma

(10) Patent No.: US 9,992,360 B2
(45) Date of Patent: Jun. 5, 2018

(54) IMAGE PROCESSING APPARATUS, IMAGE PROCESSING SYSTEM, INFORMATION PROCESSING METHOD, AND STORAGE MEDIUM, FOR SUPPORTING DOCUMENT WORKFLOWS

(71) Applicant: CANON KABUSHIKI KAISHA, Tokyo (JP)

(72) Inventor: Satoshi Okuma, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/403,966

(22) Filed: Jan. 11, 2017

(65) Prior Publication Data

US 2017/0201637 A1    Jul. 13, 2017

(30) Foreign Application Priority Data

Jan. 13, 2016   (JP) ................................ 2016-004566

(51) Int. Cl.
*G06F 15/00*    (2006.01)
*G06F 3/12*    (2006.01)
*G06K 1/00*    (2006.01)
*H04N 1/00*    (2006.01)

(52) U.S. Cl.
CPC ....... *H04N 1/00344* (2013.01); *G06F 3/1208* (2013.01); *G06F 3/1256* (2013.01); *G06F 3/1276* (2013.01); *H04N 1/00477* (2013.01); *H04N 2201/0094* (2013.01)

(58) Field of Classification Search
CPC ........... H04N 1/00344; H04N 1/00477; H04N 2201/0094; G06F 3/1208; G06F 3/1256; G06F 3/1276
USPC .................................................. 358/1.1–1.18
See application file for complete search history.

(56) References Cited

U.S. PATENT DOCUMENTS

2013/0104052 A1*   4/2013   Chang ................. H04L 12/2805
                                                                  715/752

FOREIGN PATENT DOCUMENTS

JP         2010160762 A      7/2010

* cited by examiner

*Primary Examiner* — Douglas Tran
(74) *Attorney, Agent, or Firm* — Canon U.S.A., Inc. IP Division

(57) ABSTRACT

An image processing apparatus includes at least one memory device that stores a set of instructions, and at least one processor that executes the instructions to generate an operation instruction object related to a workflow based a generation instruction for the operation instruction object, display the operation instruction object on a display unit, and perform control to not display the operation instruction object on the display unit based on a received deletion instruction far the operation instruction object.

14 Claims, 11 Drawing Sheets

IMAGE PROCESSING APPARATUS, IMAGE PROCESSING SYSTEM, INFORMATION PROCESSING METHOD, AND STORAGE MEDIUM, FOR SUPPORTING DOCUMENT WORKFLOWS

BACKGROUND

Field

The present disclosure relates to an image processing apparatus, a system, an information processing method, and a storage medium related to a workflow.

Description of the Related Art

To improve the efficiency of routine work involving document handling, automatic execution of a document work flow by using a workflow engine is now attracting attention.

A workflow engine runs on a server and executes tasks according to a predetermined workflow procedure. Examples of the tasks include printing of a document file on the server by a printer, and notifying an operator of an email. The workflow engine can cause personal computers (PCs) and other devices connected to the server via a network to perform processing such as printing of a document file and transmission of a stored email.

In processing that involves scanning of a paper document, like scanning the paper document and transmitting electronic data, the physical paper document needs to be set on scanner. Such processing is unable to be automatically performed by the workflow engine alone. Thus, where processing that involves scanning of a paper document is involved, an operation instruction button for executing the scan defined by the workflow procedure is in some cases generated on an operation unit of a multifunction peripheral (MFP) in advance. In some cases, a user only needs to manually set the paper document on the scanner and select the operation instruction button to execute scan processing. Such an operation instruction button s usually generated on the operation unit of the MFP in advance by an administrator or a creator of the workflow.

Japanese Patent Application Laid-Open No. 2010-160762 discusses a technique in which a workflow execution system generates such a scan execution instruction button an MFP when starting a workflow.

An operation instruction button may be generated on the MFP for each workflow procedure defining a series of processes of workflow. As the number of workflow procedures increases, the number of operation instruction buttons generated on an operation screen of the MFP also increases. As a result, the user may have difficulty in finding the operation instruction button for executing an intended workflow from among the plurality of operation instruction buttons on the operation screen of the MFP. This creates a risk that the user may press a wrong operation instruction button.

SUMMARY OF THE INVENTION

According to various embodiments, an image processing apparatus includes at least one memory device that stores a set of instructions, and at least one processor that executes the instructions to generate an operation instruction object related to a workflow based on a generation instruction for the operation instruction object, display the operation instruction object on a display unit, and perform to not display the operation instruction object on the display unit based on a received deletion instruction for the operation instruction object.

Further features will become apparent from the following description of exemplary embodiments with reference to the attached drawings.

DESCRIPTION OF THE EMBODIMENTS

Exemplary embodiments will be described below with reference to the drawings.

Figure 1:
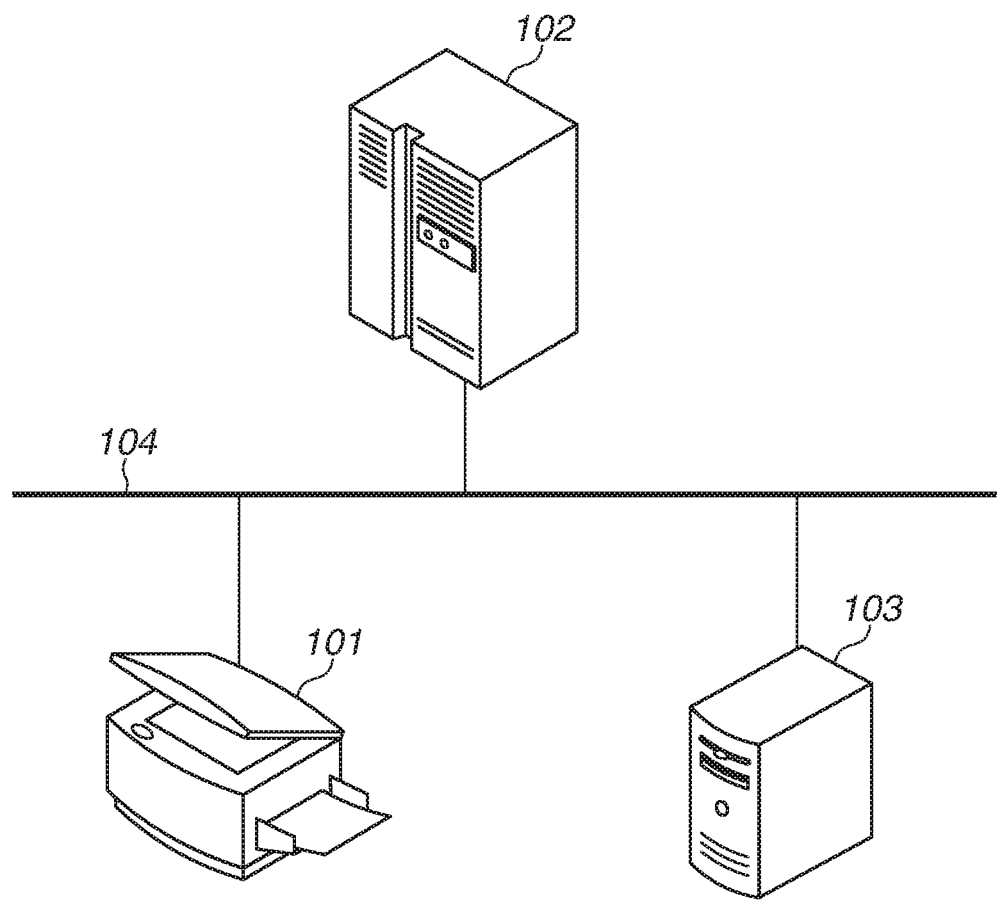
FIG. 1 is a diagram illustrating an example of a system configuration of a workflow system according to one embodiment.

A first exemplary embodiment will be described below. FIG. 1 is a diagram illustrating an example of a system configuration of a workflow system.

The workflow system includes an MFP 101, a server hereinafter, a workflow (WF) server) 102 on which a workflow engine is installed, and a PC 103. The MFP 101, the WF server 102, and the PC 103 are connected via a network constituted by a local area network (LAN) 104. The MFP 101 is an example of an image processing apparatus. The WF server 102 is an example of an information processing apparatus.

The MFP 101 includes functions such as a copy function and a scan and transmission function. The copy function is to scan a paper medium, and form and print an image on a sheet based on the scanned data. The scan and transmission function is to transmit scanned data to the WF server 102 or the PC 103 via the network in the form of electronic data. The MFP 101 further includes functions of printing out transmitted image data and performing scan and transmission according to a request from an external apparatus connected via the network, such as the WF server 102. Setting values of the print, copy, and scan and transmission functions are specified by WF server 102, i.e., a request source of execution of processing, when the WF server 102 requests the execution.

The WF server 102 implements functions of the WF engine which performs processing in order according to processing order specified in advance. The WF engine automatically performs processing according to workflow definitions which describe processing order instructed in advance. Examples or the processing include file operations on the WF server 102 and the PC 103, transmission of an email to a mail server, and a processing execution request to the MFP 101.

Figure 2:
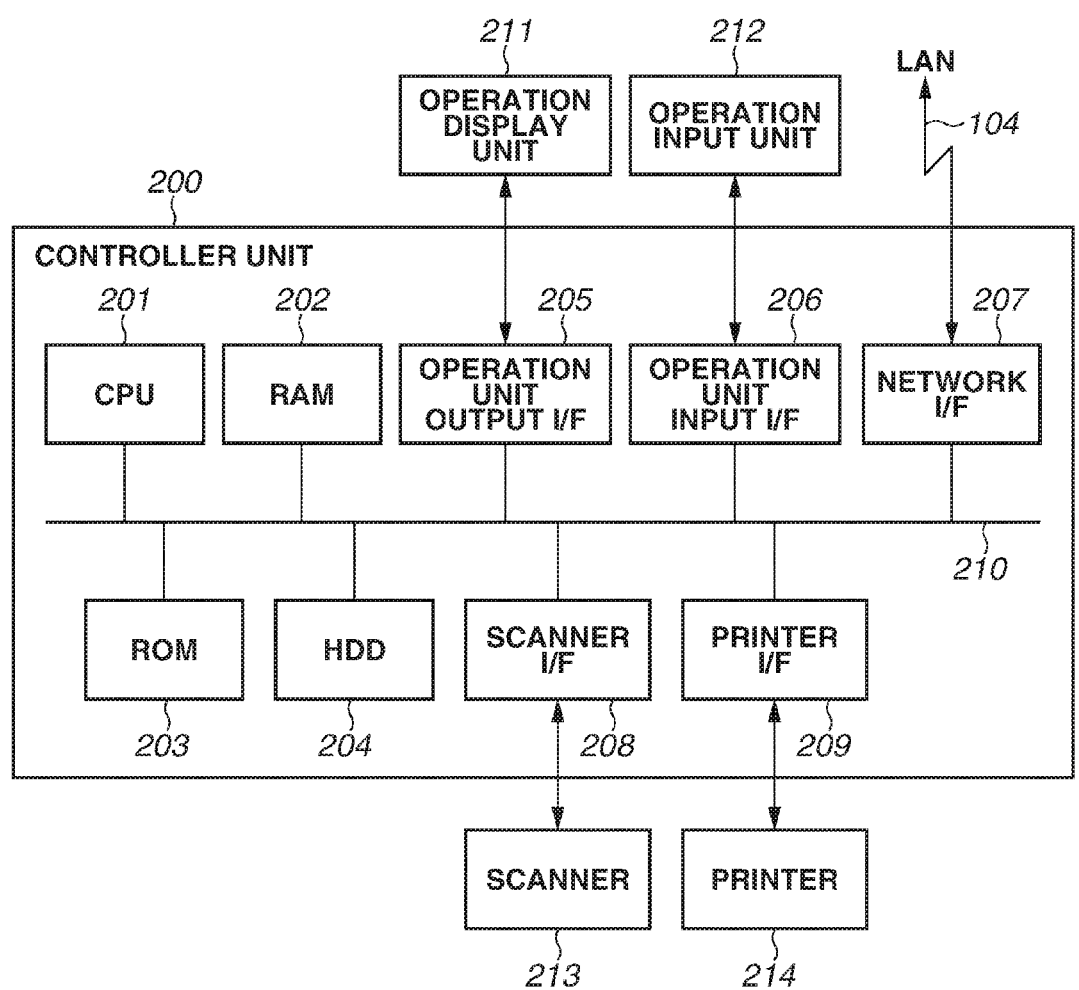
FIG. 2 is a diagram illustrating an example of a hardware configuration of a multifunction peripheral (MFP) according to one embodiment.

FIG. 2 is a diagram illustrating an example of a hardware configuration of the MFP 101.

The MFP 101 includes a controller unit 200 to which a scanner 213 and a printer 214 are connected. An operation display unit 211, an operation input unit 212, and the LAN 104 can also be connected to the controller unit 200.

The controller unit 200 includes a central processing unit (CPU) 201 which executes various control programs.

The CPU 201 activates the MFP 101 based on a boot program stored in a read-only memory (ROM) 203. The CPU 201 reads control programs stored in a hard disk drive (HDD) 204, and performs predetermined processing by using a random access memory (RAM) 202 as a work area.

The HDD 204 stores various control programs including the copy function and the scan and transmission function. The HDD 204 stores scan data read from the scanner 213.

An operation unit output interface (I/F) 205 performs data output communication control on data to the operation display unit 211.

An operation unit input interface I/F 206 performs data input communication control on data from the operation input unit 212.

A network I/F 207 is connected to the LAN 104 and performs input/output control on information via the LAN 104.

A scanner I/F 208 inputs image data from the scanner 213, and inputs and outputs scanner control data.

A printer I/F 209 outputs image data to the printer 214, and inputs and outputs printer control data.

Such devices 201 to 209 are arranged on a system bus 210.

The operation input unit 212 is an instruction input interface for inputting instructions from a user. The operation input unit 212 includes input devices such as a touch panel and hardware keys. The hardware keys include a start button for giving an instruction to start scanning a paper document.

The operation display unit 211 is a display interface for providing display to the user. The operation display unit 211 includes a display device such as a liquid crystal display (LCD) and a light-emitting diode (LED).

The scanner 213 includes an optical reading device such as a charge-coupled device (CCD). The scanner 213 has a function of optically scanning and reading a paper medium as electronic image data.

The printer 214 has a function of forming electronic image data as an image on recording medium such as a sheet.

The MFP 101 can accept execution requests for print processing and the like from external devices via the network I/F 207. An execution request for processing is issued from an external device along with a type of the processing to be executed and information about setting values to be used during execution. The execution request is temporarily stored in the HDD 204 or the RAM 204, and then executed by the CPU 201.

If the execution-requested processing includes scan processing like a scan and transmission, the MFP 101 can display an instruction button for starting to execute the processing (start instruction button) on the operation display unit 211. In such a case, the user sets the original on the scanner 213 and designates the start instruction button via the operation input unit 212. The MFP 101 then performs scan processing according to the setting values specified by the request from an external device.

Figure 10:
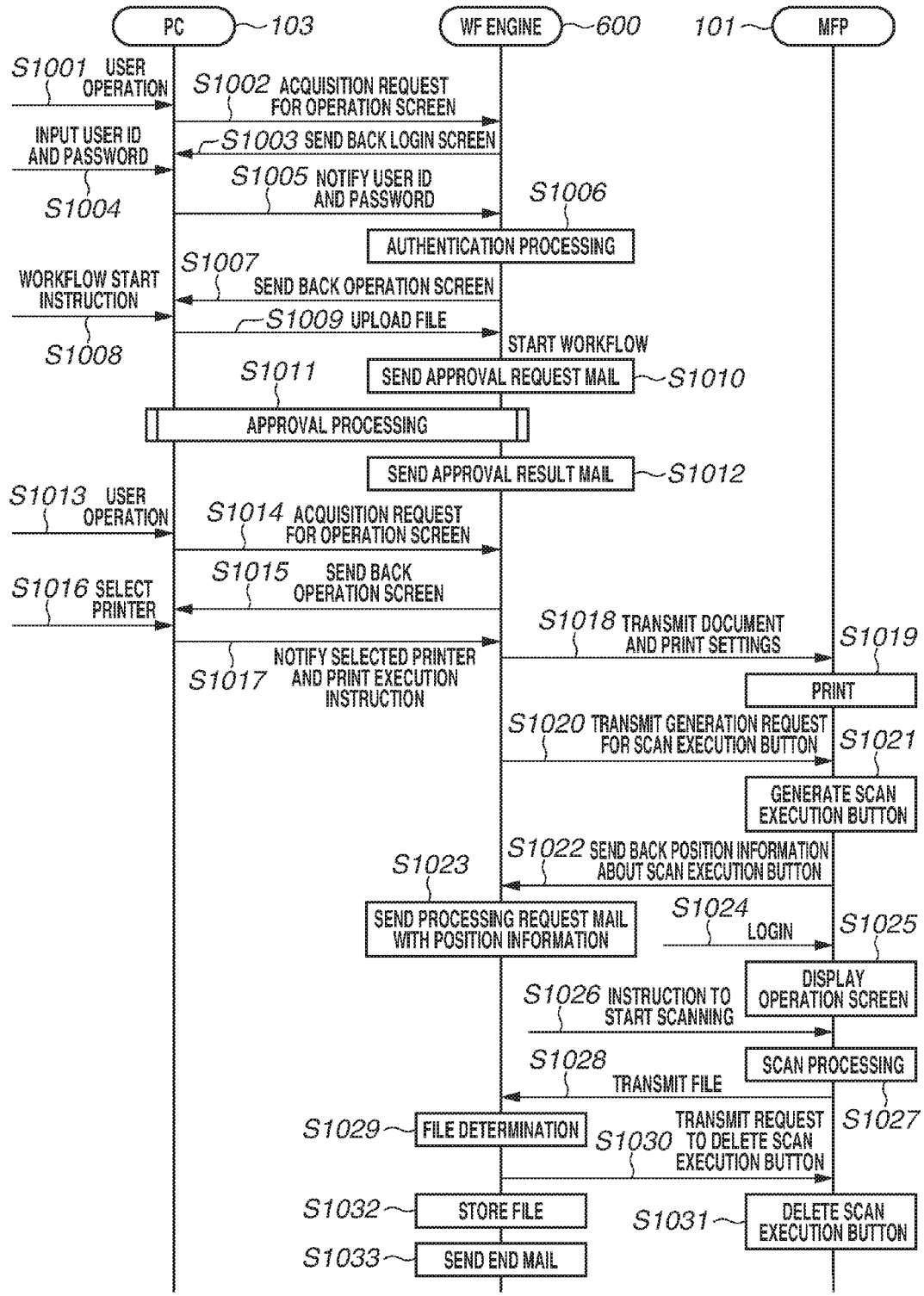
FIG. 10 is a sequence diagram illustrating a flow of processing performed by the apparatuses of the workflow system according to one embodiment.

The CPU 201 performs processing based on the programs stored in the ROM 203 or the HDD 204 to implement the functions of the MFP 101 and the processing of the MFP 101 in the sequence diagrams of the entire system in FIGS. 6 and 10 to be described below.

Figure 3:
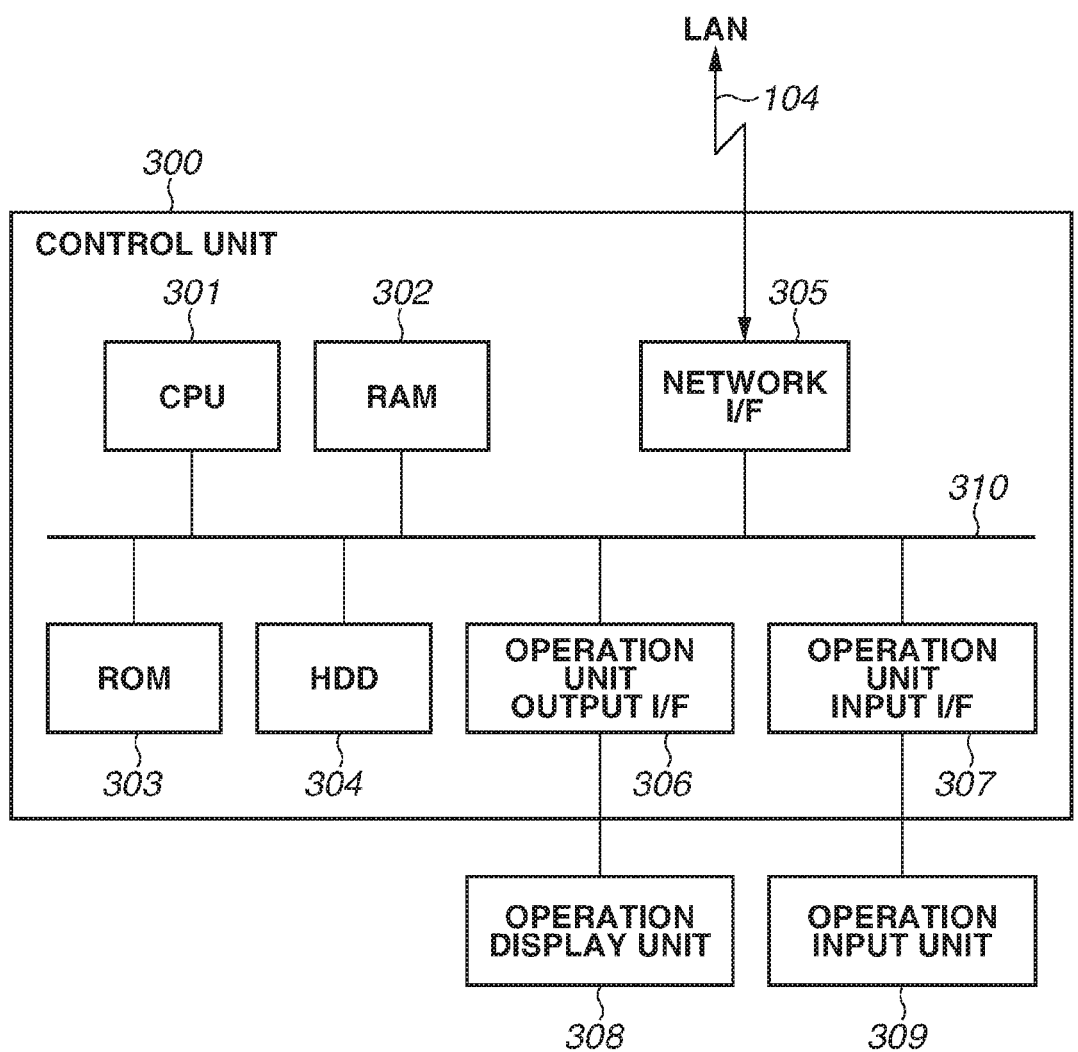
FIG. 3 is a diagram illustrating an example of a hardware configuration of a workflow (WF) server according to one embodiment.

FIG. 3 is a diagram illustrating an example of a hardware configuration of the WF server 102.

The WF server 102 includes a control unit 300 which can connect to the LAN 104.

The control unit 300 includes a CPU 301 which executes various control programs. The control unit 300 controls an operation of the entire WF server 102.

The CPU 301 reads control programs stored in a ROM 303 or a HDD 304, and performs predetermined processing by using a RAM 302 as a work area. The HDD 304 stores various control programs including the functions of the WF engine, a web server, and a workflow editor. The HDD 304 also stores workflow definitions to be executed by the WF engine.

A network I/F 305 performs input/output control on information via the LAN 104.

An operation unit output I/F 306 performs data output, communication control on data to an operation display unit 308.

An operation unit input I/F 307 performs data input communication control on data from the operation input unit 309.

Such devices 301 to 307 are arranged on a system bus 310.

The operation display unit 308 is a display interface for presenting a display to the user. The operation display unit 308 includes a display device such as an LCD and an LED.

The operation input unit 309 is an instruction input interface for inputting instructions from the user. The operation input unit 309 includes input devices such as a keyboard and a mouse.

The web server runs on the WF server 102. The WF engine can provide Hypertext Markup Language (HTML) contents by using the web server. The WF engine can dynamically generate contents by Common Gateway Interface (CGI), and can provide an operation screen for executing a workflow. The CPU 301 performs processing based on programs stored in the ROM 303 or HDD 304 to implement the following functions and processing. In other words, the functions of the WF server 102, such as the WF engine, the web server, and the workflow editor to be described below, are implemented. The processing of the WF server 102 in the sequence diagrams of the entire system in FIGS. 6 and to be described below, and the processing of the flowcharts of FIGS. 9 and 11 to be described below are also implemented. The PC 103 has a hardware configuration similar to that of the WF server 102. The CPU of the PC 103 performs processing based on programs stored in the ROM or HDD of the PC 103 to implement the functions of the PC 103 and the processing of the PC 103 in the sequence diagrams of the entire system in FIGS. 6 and 10 to be described below.

Figure 4:
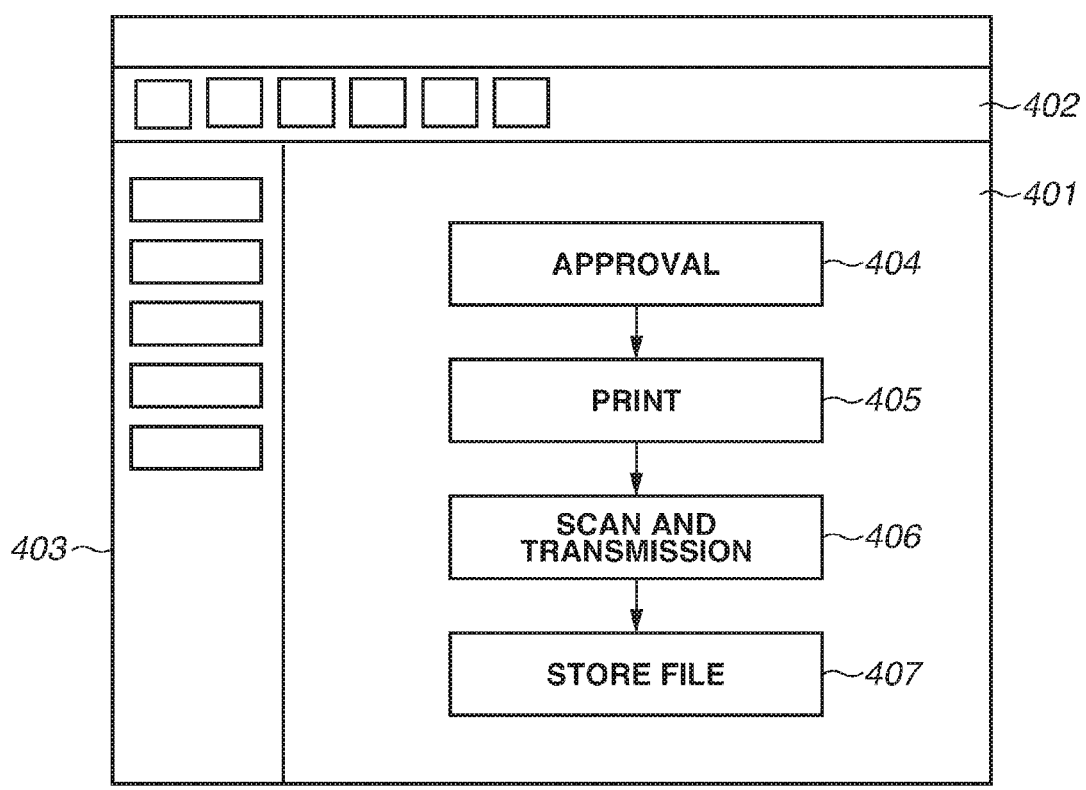
FIG. 4 is a diagram illustrating an example of an operation screen of a workflow editor according to one embodiment.

FIG. 4 is a diagram illustrating an example of an operation screen of the workflow editor which is displayed on the operation display unit 308 of the WF server 102. The workflow editor is an editing tool for defining a workflow to be executed by the WF engine on the WF server 102. The workflow editor usually runs as an application on the WF server 102 and generates a definition file of a workflow (workflow definition file). The WE engine reads the generated workflow definition file and executes the workflow.

A flow editing section 401 displays the workflow currently being edited. The workflow editor displays processes in the workflow as respective graphic figures. The workflow can be visually edited by connecting the figures with symbols such as an arrow indicating a direction. In the example of FIG. 4, flow processes 404 to 407 of the workflow are displayed as respective graphic figures. The arrows connecting the figures represent the execution order of the workflow. The user can operate the workflow editor and change the types and layout of the figures and the order in which the arrows are to be connected to edit the processes to be performed in the workflow and the order thereof. As illustrated in FIG. 4, the flow processes 404, 405, 406, and 407 of the workflow are performed in such order.

An editor menu section 402 includes instruction buttons or menu for making operations related to the workflow. Examples of the operations include storing the edited workflow, reading the stored workflow, and deleting processes in the workflow.

A flow selection section 403 includes buttons of the respective processes in the workflow edited in the flow editing section 401. The user edits the workflow by selecting desired processes to be performed in the workflow from the flow selection unit 403 and then arranging the processes in the flow editing section 401 by mouse drag-and-drop operations. If the user selects any one of the flow processes 404 to 407 and selects a menu for editing from the editor menu section 402, the user can set detailed setting values of the selected flow process. For example, the flow process 405 is a process for instructing the MFP 101 to perform printing. The user selects the flow process 405 and selects a menu for editing. Then, a screen for making settings about the number of copies to be printed, two-sided printing, and a print layout appears. The user can set such values on the screen.

Figure 5:
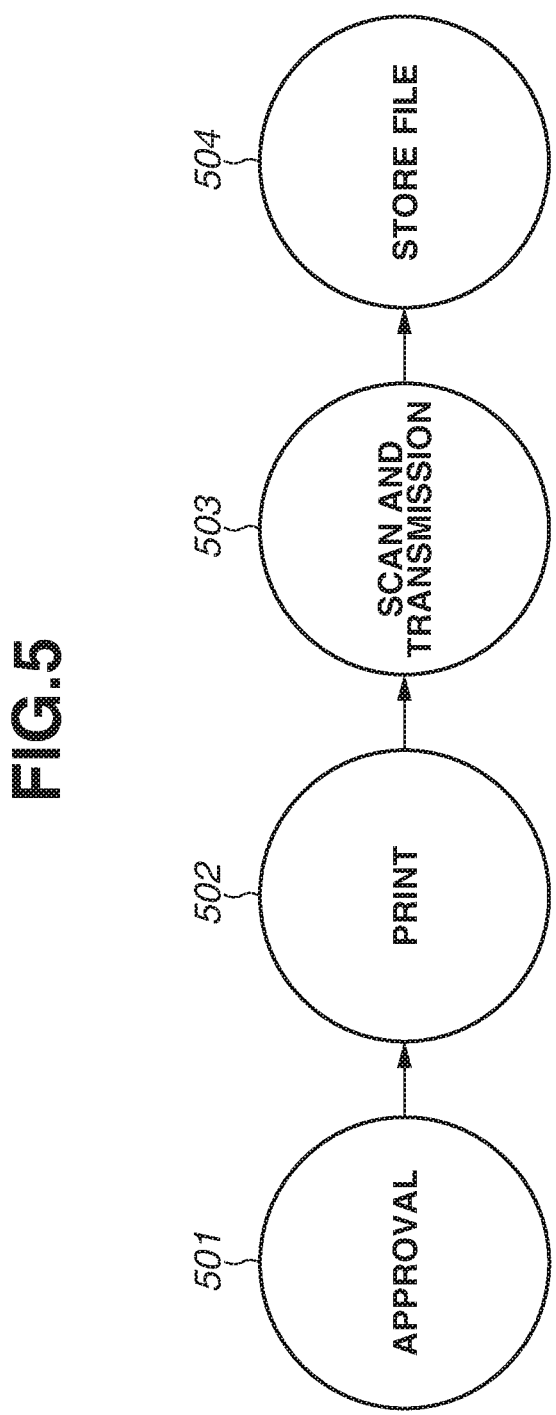
FIG. 5 is a diagram schematically illustrating an example of a workflow according to one embodiment.

FIG. 5 is a diagram schematically illustrating an example of the workflow edited on the edit screen of the workflow editor illustrated in FIG. 4.

Flow processes 501 to 504 represent respective processes of the workflow to be executed by the WF engine.

The workflow represented by the flow processes 501 to 504 is one for processing a document. As illustrated in the example of FIG. 5, the flow processes 501 to 504 are executed in succession. The WF engine performs control to successively execute such processes a document of electronic data that is specified when the workflow is started.

The flow process 501 is approval processing. The approval processing is intended, for example, to get approval of the contents described in the document from the superior of the user who has specified the document and instructed the start of the workflow. More specifically the WF engine obtains an email address of the superior of the user who has started the workflow from a directory service or a database, and transmits by email a request for approval and input instructions performed on a web screen provided by the WF engine. If the superior inputs a result indicating permission from the web screen provided by the WF engine, the WF engine performs the next flow process 502. For the sake of simplicity, a description of situations in which the superior makes an input other than permission, such as rejection, will be omitted.

The flow process 502 is processing for printing he document by the MFP 101. More specifically, the WF engine displays an instruction screen related to printing on a web screen. If the user gives an instruction for printing, the WF engine transmits the document to the MFP 101 and instructs the MFP 101 to print the document. Since printing of a document involves acquisition of the printed sheet(s), the WF engine does not automatically perform printing, but prompts the user to give an instruction for printing to perform the printing. If there is a plurality of MFPs that can perform the printing, the WE engine may make the user specify which MFP to print the document.

After the printing is performed in the flow process 502, the WF engine performs the next flow process 503. The flow process 503 is processing for causing the MFP 101 to scan the paper document and transmit the scanned electronic data to the WF server 102. More specifically, the WF engine initially instructs the MFP 101 to generate an instruction button for executing scan and transmission (scan and transmission start instruction button). Herein, the WF engine specifies the setting values of the scan and transmission to be executed when the instruction button is designated, in association with the instruction button. The WF engine further notifies the user who has started the workflow of the generation of the scan and transmission start instruction button on the MFP 101 by email. If the user designates the scan transmission start instruction button on the MFP 101 to execute scan and transmission, electronic data read by the scanning is transmitted to a transmission destination specified by the WF engine. The WF engine monitors reception of the electronic data. If the reception of the electronic data is confirmed, the WF engine performs e next flow process 504.

The flow process 504 is processing for storing the electronic data as a file in a file system of the PC 103 or a file server. More specifically, the WF engine converts the received electronic data into a predetermined file format and/or changes the filename, and then moves the file to a specified location of the file system.

If the file has been moved to the specifed location in the flow process 504, the WF engine sends an email stating that all the processing of the workflow has been executed to the user, and completes the execution of the workflow.

In the workflow including the flow processes 501 to 504, the following processes are performed in succession. For an application form generated as electronic data confirmation and approval by the superior, printing, signing of the printed paper document, storing of the signed paper document as electronic data, and submission of the paper document are performed in succession.

Such processes are an example based on an application form processing flow which is commonly performed in offices.

In the following description of the exemplary embodiment, the workflow illustrated in FIG. 5 is used as example of the workflow to be executed by the WF engine. The flow processes 501 to 504 of the workflow can be subdivided into several smaller processes as described above.

For the sake of convenience, execution units of a workflow into which several detailed pieces of processing are collected, like the flow processes 501 to 504, will be referred to as tasks. Detailed units of execution of processing in each task, such as transmission of an email and a change of a filename, will be referred to for convenience as actions. For example, a flow process 501 and a task 501 are synonyms.

Figure 6:
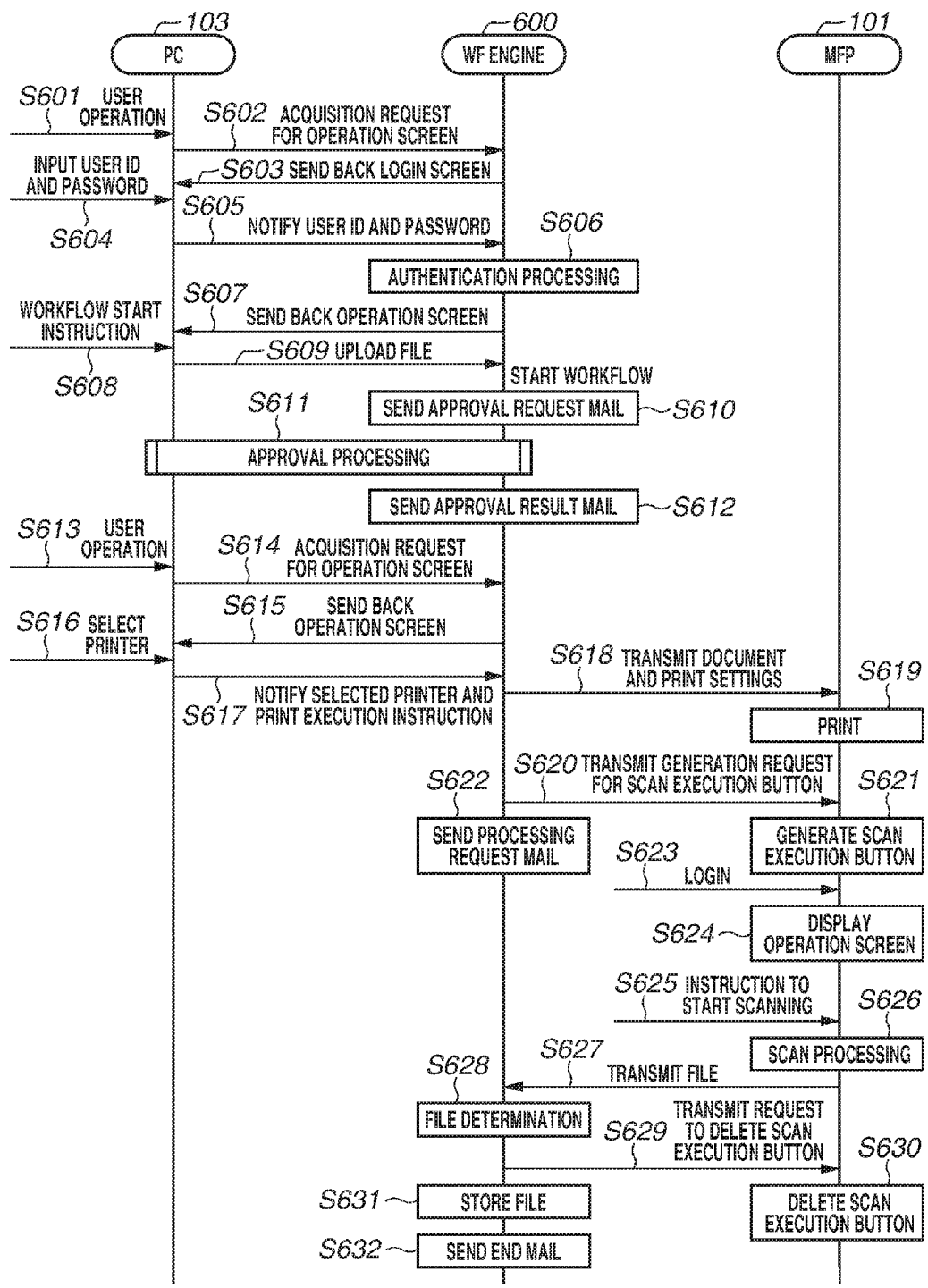
FIG. 6 is a sequence diagram illustrating a flow of processing performed by apparatuses of the workflow system according to one embodiment.

FIG. 6 is a sequence diagram illustrating a flow of processing performed by the apparatuses in the entire system illustrated in FIG. 1 when the WF engine executes the workflow illustrated in FIG. 5.

In step S601, the web browser on the PC 103 generates a document file, such as an application form as electronic data, according to user operations. The web browser then accesses the WF engine 600 on the WF server 102.

In step S602, the web browser on the PC 103 transmits an acquisition request for an operation screen to the WF engine 600 via the web server on the WF server 102. The WB engine 600 receives an access request from the web server, performs user authentication, and generates an operation screen related to a workflow of toe authenticated user. The WF engine 600 then sends back a response to the PC 103 via the web server.

In step S603, if the WF engine 600 determines that the acquisition request from the PC 103 is made by a user not logged in the WF engine 600, the WF engine 600 generates and sends back a login screen to the PC 103. If the user is determined to have already logged in, the WF engine 600 performs the processing of step S607.

After the login screen is sent back to the PC 103 in step S603, the processing proceeds to step S604. In step S604, the web browser on the PC 103 accepts input of a user identifier (ID) and a password according to user operations via the login screen. The web browser further accepts a login instruction.

In step S605, the web browser on the PC 103 notifies the WF engine 600 of the user ID and the password input by the user via the WF server 102.

In step S606, the WF engine 600 performs authentication processing for determining whether the notified user is one to be managed by the WF engine 600. The authentication processing may include authentication by an external directory service. The authentication processing may be performed by matching of the user ID and the password within an internal database.

If the logged-in user is determined to be one to be managed, the processing proceeds to step S607. In step S607, the WF engine 600 generates an operation screen related to the workflow of he logged-in user, and sends back the operation screen to the PC 103.

Figure 7:
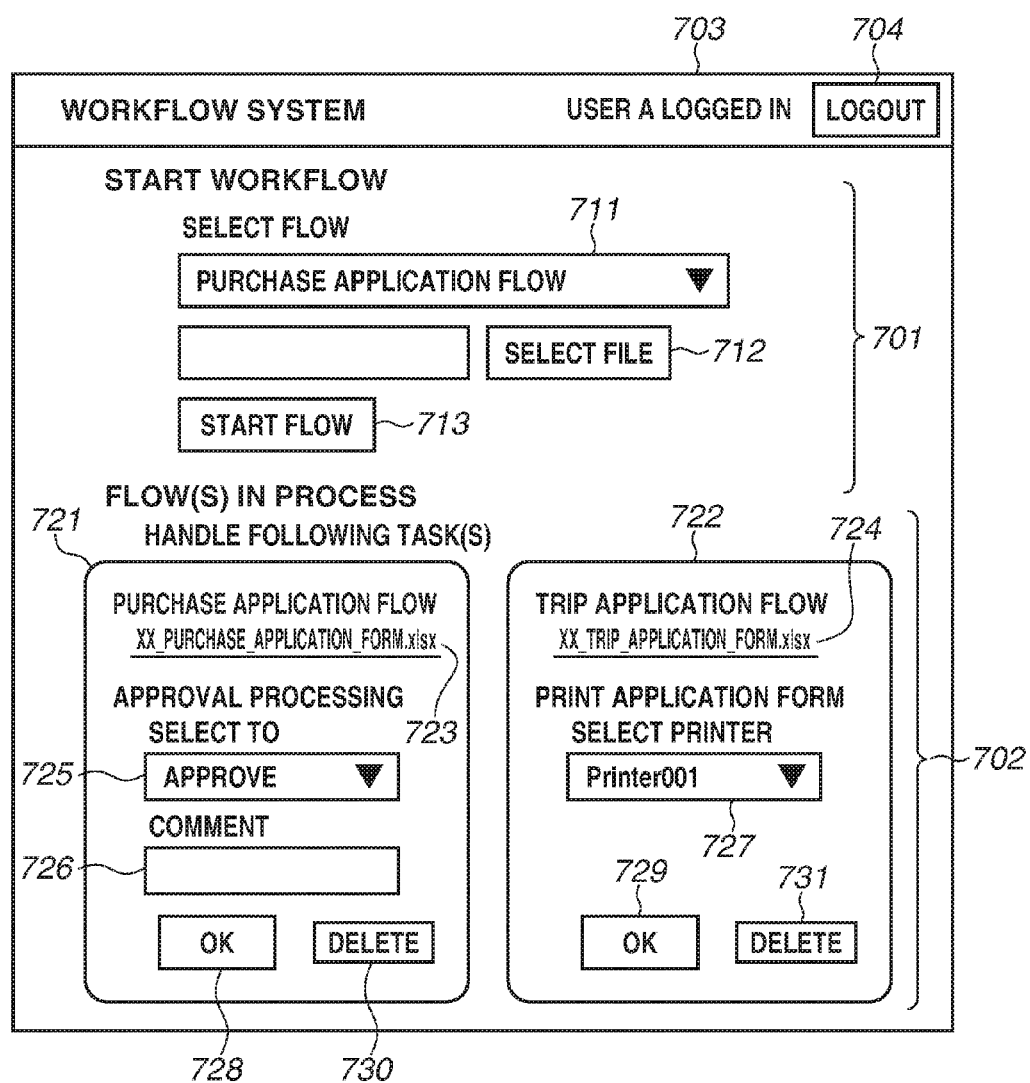
FIG. 7 is a diagram illustrating an example of an operation screen displayed on a web browser according to one embodiment.

FIG. 7 is a diagram illustrating an example of the operation screen displayed on the web browser of the PC 103 after step S607.

The operation screen includes two large areas, a flow start instruction area 701 and an in-process flow display area 702. The flow start instruction area 701 displays selection options and buttons for giving an instruction to start a workflow. The in-process flow display area 702 displays a list of workflows in which some instructions from the logged-in user are required. The in-process display area 702 also displays buttons for inputting the user's instructions needed to execute the tasks of the workflows.

A login user display area 703 displays the username of the user currently logged in. A logout button 704 is a button for giving a logout instruction to end the current display and operation.

A workflow selection button 711 is a pulldown button for selecting a workflow to be executed by the WF engine 600. Which workflow to select usually depends on the document to be processed by the workflow. Examples of the document include a purchase application form and a trip application form.

A file selection button 712 is a button for specifying a document file to be actually processed by the selected workflow. If the user designates the selection button 712, a dialog box for selecting a file in the HDD 304 of the PC 103 appears on the operation screen. The user can select a desired document file from the dialog box.

A flow start button 713 is a button for starting the execution of the workflow selected by the workflow selection button 711 on the document selected by the file selection button 712.

Task display areas 721 and 722 are areas for displaying information about respective tasks currently executed by the logged-in user. The task display areas 721 and 722 each display the name of the workflow in process, the name of the task currently executed in the workflow, and buttons for inputting user instructions needed to execute the task.

Document links 723 and 724 display the names of the documents that the respective workflows are processing. The document links 723 and 724 are links to the actual documents managed by the WF engine 600. The document links 723 and 724 can be designated to display the contents of the documents.

An approval button 725 is a button for specifying an approval result. The approval button 725 is a pulldown button for selecting whether the superior gives approval in the task 501 of FIG. 5. The user can use the approval button 725 to select whether to approve or reject.

A comment input, area 726 is a text input field for inputting a comment on the applicant in notifying the approval result. When the WF engine 600 sends the approval result to the applicant user by an email, the comment input here is added to the main body of the email.

A printer selection button 727 is a pulldown button for selecting a printer. By using the printer selection button 727, the user selects which printer to be used for printing the document in the task 502 of FIG. 2. The WF engine 600 may determine and set a specific printer in the workflow definitions in advance. The WF engine 600 may makes the user select a printer from a plurality of output destination candidates as described above.

Task execution buttons 728 and 729 are buttons for giving instructions to execute the tasks displayed in the task display areas 721 and 722, respectively, with the set setting values.

If the user designates the task execution buttons 728 and 729, the setting values displayed in the task display areas 721 and 722 are notified to the WF engine 600. The WF engine 600 performs processing according to the notified setting values and the contents of the tasks.

Flow deletion buttons 730 and 731 are buttons for aborting the workflows in which the displayed tasks are executed.

The display contents of the task display areas 721 and 722 change with the progress of processing of the workflows, i.e., depending on which tasks of the workflows are currently in process.

The WF engine 600 dynamically generates a screen according to the contents of the tasks currently in process, and sends back the screen to the PC 103. In step S607, the WF engine 600 sends back the screen to the PC 103. The web browser on the PC 103 then displays an operation screen such as illustrated in FIG. 7. From the operation screen, the user gives a workflow start instruction for starting a workflow. In step S608, the web browser on the PC 103 receives the specification of the workflow and the selection of the file according to the user operations via the operation screen of FIG. 7, and receives the workflow start instruction. For example, the user specifies a workflow corresponding to the workflow of FIG. 5 by using the workflow selection button 711 on the operation screen of FIG. 7. The user also selects an application form file to execute the workflow using the file selection button 712. The user selects the flow start button 713 to give an instruction to start the workflow.

After the instruction to start the workflow is given, in step S609, the web browser of the PC 103 uploads the selected file to the WF engine 600, and notifies the WF engine 600 of the workflow instructed to be started. The WF engine 600 receives the workflow instructed to be started and the file, reads the definitions of the workflow instructed to be started, and executes the workflow on the received document.

In the workflow illustrated in FIG. 5, the approval task 501 is initially executed. In the approval task 501, an action to send an email requesting approval (approval request mail) is initially performed. In step S610, the WE engine 600 transmits an email stating that approval is requested, to the superior of the applicant user. Aside from the sending of an email, any means may be used for user notification. Examples may include an in-house social networking service (SNS) and a messaging application.

The superior of the applicant user receives the email, accesses the WF server 102, and requests approval processing. In step S611, the WF server 102 receives the request and executes the approval processing. For the sake of simplicity, a description of a detailed flow of the processing associated with the approval processing be omitted.

After the end of the approval processing by the superior of the applicant user, the processing proceeds to step 1612. In step S612, the WF engine 600 sends the applicant user an email including the approval result and the content of the next processing to be performed by the user. In the present exemplary embodiment, only a case in which the superior approves the application will be described for the sake of simplicity.

The user receives the email, and makes operations to access the web server as in step S601. In step S613, the web browser on the PC 103 accesses the WF engine 600 of the WF server 102 according to the user operations.

In step S614, the web browser on the PC 103 transmits an acquisition request for an operation screen to the WF engine 600 via the web server on the WE server 102. The web server receives an access request from the PC 103, and notifies the WF engine 600 of the access request.

In step S615, if the access request from the PC 103 is determined to be made by the user logged in the WF engine 600, the WF engine 600 generates an operation screen such as illustrated in FIG. 7 and sends back the operation screen to the PC 103. If the access request is determined to be made by a user not logged in, the WF engine 600 generates and sends back a login screen to the PC 103 as in step S603.

In the workflow of FIG. 5, the next task to be executed after the approval task 501 is the print task 502. The WF engine 600 then generates an operation screen for performing printing as illustrated in the task display area 722 of FIG. 7.

The user selects a desired printer on the generated operation screen, and gives an instruction to perform print processing. The web browser on the PC 103 receives the instruction to perform the print processing via the operation screen.

After receiving the instruction to start the print processing, then in step S617, the web browser on the PC 103 notifies the WF engine 600 of the selected printer and a print execution instruction.

In step S618, the WF engine 600 having received the print execution instruction transmits the document and the print settings determined in advance in the workflow definitions to the MFP 101 which is the selected printer. The WF engine 600 instructs the MFP 101 to print the document.

In step S619, the MFP 101 having received the instruction to print the document from the WF engine 600 prints the received document with the instructed print settings.

In step S620, the WF engine 600 transmits a generation request for a button (scan execution button) for giving an instruction to execute scan and transmission to the MFP 101. The generation request includes the setting values of scan and transmission which are determined in advance in the workflow definitions. Here, the WF engine 600 also transmits user information for generating the scan execution button and text to be displayed on the scan execution button to the MFP 101 at the same time.

In step S621, the MFP 101 instructed to generate the scan execution button by the MF engine 600 generates a button for giving an instruction to execute scan and transmission on the operation display unit 211. Here, the MFP 101 generates a button for executing scan and transmission with the specified scan and transmission settings on the operation screen of the instructed user. The scan execution button is an example of an operation instruction object.

In step S622, the WF engine 600, which instructs the MFP 101 to generate the scan execution button in step transmits the application user an email with a message for prompting execution of scan and transmission on the MFP 101 (processing request mail).

The applicant user having received the email prints out the application form and performs processing such as signing on the application form. The user brings the application form to the MFP 101, and inputs authentication information such as the user ID and password into the MFP 101 for login. In step S623, the MFP 101 receives the authentication information, and performs authentication processing similar to that performed by the WF engine 600.

After performing the authentication processing, in step S624, the MFP 101 displays an operation screen corresponding to the logged-in user.

Figure 8:
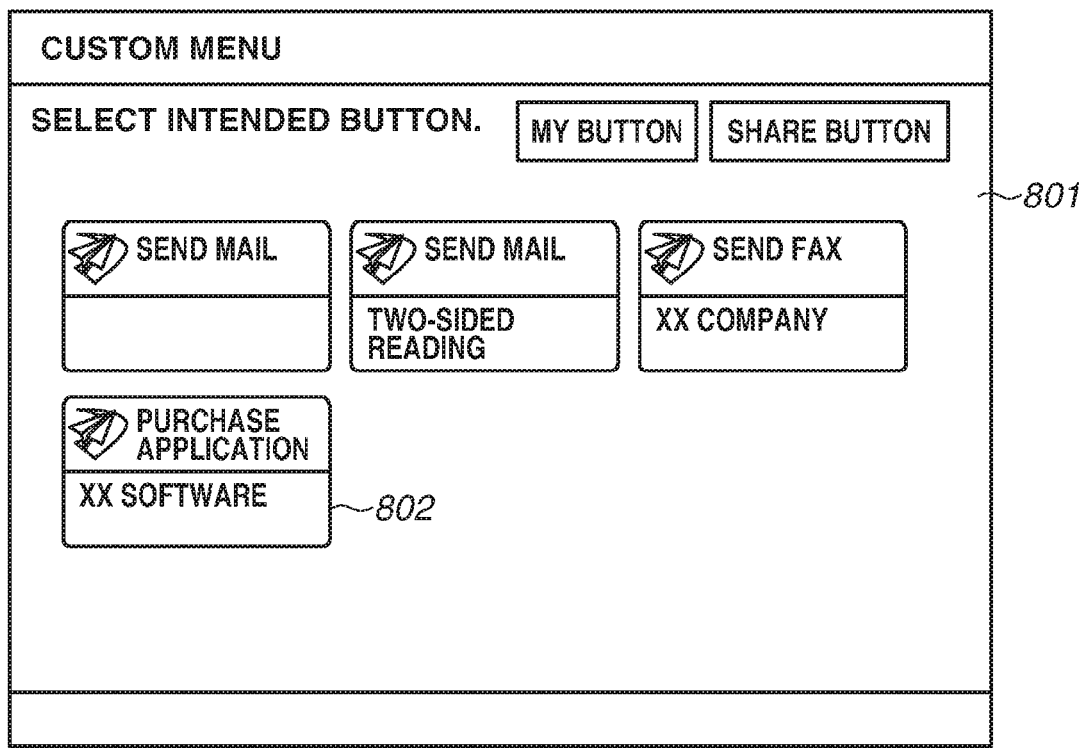
FIG. 8 is a diagram illustrating an example of an operation screen displayed on an operation display unit of the MFP according to one embodiment.

FIG. 8 is a diagram illustrating an example of the operation screen displayed on the operation display unit 211 of the MFP 101 in step S624.

A screen 801 is a screen on which the user sets contents of processing and setting values in advance, and buttons (processing execution buttons) for executing processing are generated and displayed. The user usually makes settings and generates buttons from an operation screen of the MFP 101. However, processing execution buttons may also be generated on the screen 801 by giving instructions about setting value data for generating the buttons from outside the MFP 101.

A button 802 is the button that the MFP 101 generates the operation screen of the operation display unit 211 according to the generation request for a scan execution button from the WF engine 600 in step S621. The buttons other than the button 802 are other processing execution buttons generated on the operation screen of the MFP 101.

If the generation of processing execution button is instructed from outside the MFP 101, the processing execution button is usually added to a position next to that of the last button on the screen. Since the user receives an email notification and operates the MFP 101 after the WF engine 600 generates the processing execution button on the MFP 101, the button generated by the WF 600 is likely to be the one last added. The user can thus find the button 802 generated by the WF engine 600 by paying attention to the last part of the button display on the operation screen.

Text representing the contents of the workflow is displayed on the button 802 for which the generation request is issued by the WF engine 600. The text on the button 802 is the text that the WF engine 600 transmits to he MFP 101 with the generation request for the scan execution button in step S620.

If the button 802 is detected to be pressed by the user, the MFP 101 transitions to a screen for executing scan and transmission. On the transitioned screen for executing scan and transmission, the settings needed for scan and transmission, such as the transmission destination and the means of transmission, are all preset. The user sets the document to be scanned and transmitted on a document positioning plate of the scanner 213, and presses the start button to give an instruction to start scanning. In step S625, the MFP 101 detects the pressing of the start button and thereby receives the instruction to start scanning. In step S626, the MFP 101 performs scan processing to read the document and convert the read document into data. In step S627, the MFP 101 transmits the scanned data to the WF server 102 which is the set transmission destination. The processing of step S627 is an example of data transmission processing.

After transmitting the request for generation of the scan execution button in step S620, the WF engine 600 monitors an in-box folder of the WF server 102 which is specified as the set transmission destination. In step 3628, the WF engine 600 determines whether the file set by the transmission settings in step S620 has been received in the reception folder.

If the file set in advance is determined to be received, the processing proceeds to step S629. In step S629, the WF engine 600 transmits to the MFP 101 a request to delete the scan execution button requested to be generated in step S620. For example, when the WF engine 600 issues the generation request for the scan execution button in step S620, the WE engine 600 delivers, to the MFP 101, an ID that can uniquely identify the button as part of the setting values. When making the request to delete the scan execution button, the WF engine 600 transmits the request to the MFP 101 with the ID capable of uniquely identifying the button, so that the corresponding button is deleted. Alternatively, the WF engine 600 may obtain an ID capable of uniquely identifying the button from the MFP 101 as a return value of the generation request for the scan execution button in step S620. For deletion, the WF engine 600 can specify the ID capable of uniquely identifying the button and instruct the MFP 101 to delete the corresponding button.

The WF engine 600 then performs the processing of the task 504 in FIG. 5.

In step S631, the WF engine 600 changes the filename of the received file to a previously-specified filename, and stores the file into a previously-specified folder on the WF server 102 or the PC 103.

In step S632, the WF engine 600 transmits an email (end mail) stating that all the tasks 501 to 504 of the workflow in FIG. 5 are completed to the applicant user, and completes the workflow.

As described above, if the execution of a workflow includes a task in which the user manually sets a document on the MFP 101 and executes a scan, the WF engine 600 Instructs the MFP 101 to generate and delete a button for executing the scan processing (scan execution button). The MFP 101 dynamically generates and deletes the scan execution button based on the instructions from the WF engine 600.

The scan execution button is generated at timing when scan and transmission is needed in the workflow, and deleted after the execution of the scan and transmission. Since the scan execution button is generated on the MFP 101 only when needed, trouble in finding a button and the occurrence of pressing of a wrong button due to an increased number of buttons can be prevented.

The WF engine 600 sends the processing request mail to the user who executes the scan and transmission, at timing when the WF engine 600 instructs the MFP 101 to generate the scan execution button. This can prevent the workflow from being put on standby for a long time because of the user's omission.

Figure 9:
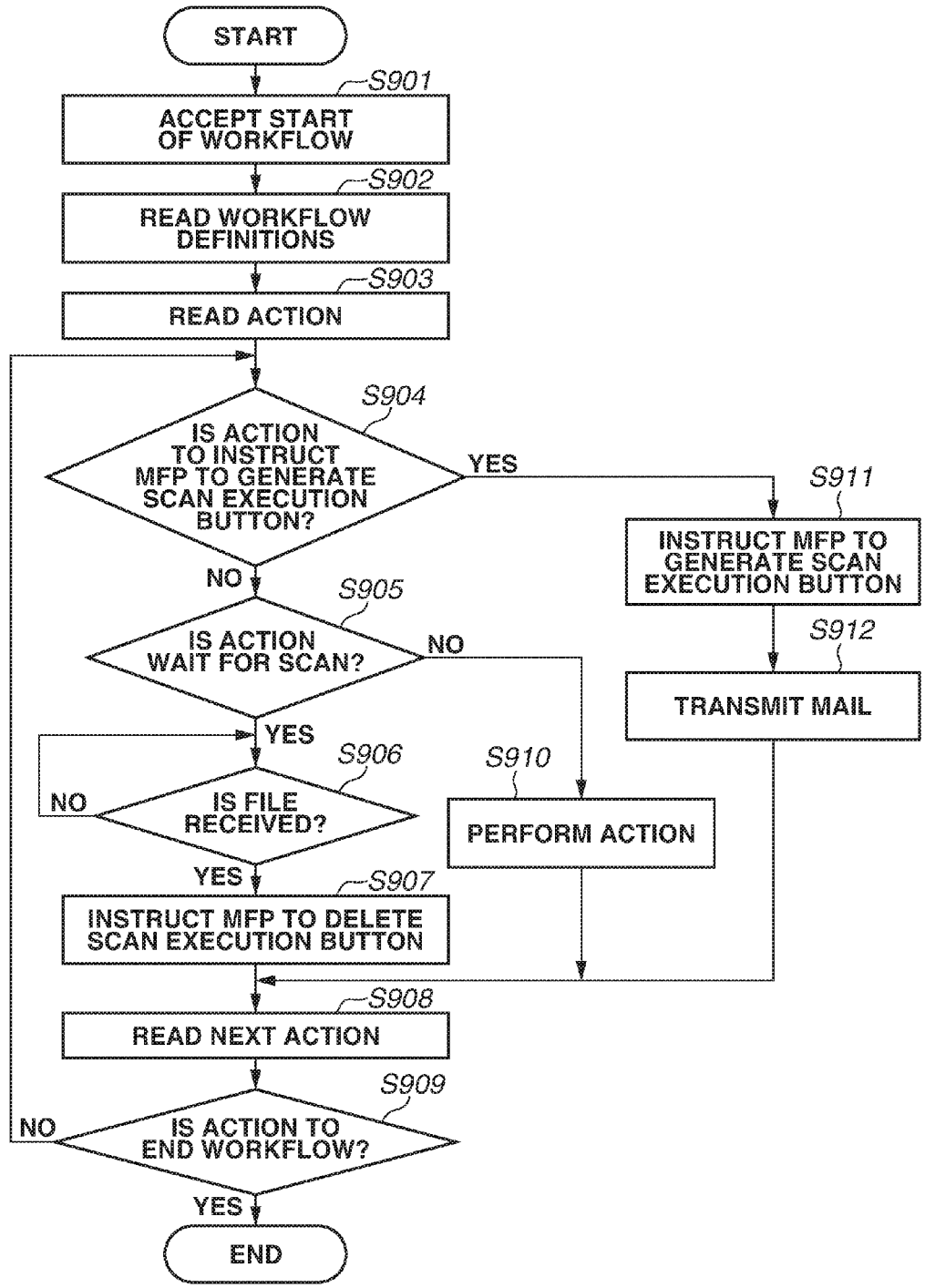
FIG. 9 is a flowchart illustrating an example of information processing by a WF engine according to one embodiment.

FIG. 9 is a flowchart illustrating an example of information processing of the WF engine 600.

In FIG. 9, the generation and deletion of the scan execution button on the MFP 101, which is main processing of the WF engine 600, will be described in detail. A description of process in for performing other tasks and actions will be omitted.

In step S901, the WF engine 600 accepts a start of a workflow. The processing of step S901 corresponds to the processing for receiving the workflow start instruction in step S608 of FIG. 6. The processing of step S901 also includes uploading of a file, and preceding login processing and screen transmission processing to be performed with the PC 103.

In step S902, the WF engine 600 reads the workflow definitions of the instructed workflow from the HDD 304.

In step S903 and subsequent steps, the WF engine 600 sequentially reads and executes tasks of the workflow and the actions included therein according to the read workflow definitions.

In step S904, the WF engine 600 determines whether each action is to instruct the MFP 101 to generate a scan execution button.

If the WF engine 600 determines that the action is to instruct the MFP 101 to generate a scan execution button (YES in step S904), the processing proceeds to step S911. In step S911, the WF engine 600 instructs the MFP 101 to generate a scan execution button. The processing of step S911 is similar to that of step S620 in FIG. 6.

In step S912, the WF engine 600 transmits an email stating that the scan execution button is generated and a scan is requested to be executed to the user who is the applicant. The processing of step S912 is similar to that of step S622 in FIG. 6.

In such a manner, the generation of the scan execution button and the notification of the button generation to the user are performed as a series of actions.

In step S908, the WF engine 600 reads the next action.

In step S904, if the action is determined to not be to instruct the MFP 101 to generate a scan execution button (NO in step S904), the processing proceeds to step S905. In step S905, the WF engine 600 determines whether the action is to wait for a scan to be executed by the user.

If the action is to wait for a scan to be executed by the user (YES in step S905), the processing proceeds to step S906. In step S906, the WF engine 600 checks for reception of a file transmitted by scan and transmission. More specifically, the WF engine 600 determines whether a preset file has been generated in the folder set as the transmission destination of scan and transmission. The processing of step S906 is similar to that of step S628 in FIG. 6. Alternatively, the WF engine 600 may inquire of the MFP 101 whether a job is executed as a result of pressing of the button that the WF engine 600 has instructed the MFP 101 to generate, and determine based on the result of inquiry whether the job has been executed. The WF engine 600 may obtains a job execution log of the MFP 101 and determine whether the execution of the instructed scan execution job has been completed.

If the file is confirmed to be received (YES in step S906), the processing proceeds to step S907. In step S907, the WF engine 600 instructs the MFP 101 to delete the scan execution button. The processing of step S907 is similar to that of step S629 in FIG. 6.

In step S908, the WF engine 600 reads the next action.

In such a manner, the confirmation of the execution completion of the scan execution processing and the instruction to delete the scan execution button are performed as a series of actions.

In step S905, if the action is determined to not be to wait for a scan to be executed (NO in step S905), the processing proceeds to step S910. In step S910, the WF engine 600 performs the corresponding action. Examples of the action in step S910 include the print processing of the MFP 101 and the approval processing the superior of the applicant user. A detailed description thereof will be omitted.

In step S908, the WF engine 600 reads the next action. In step S909, the WF engine 600 determines whether he action represents an end of the workflow.

If the action is determined to be not to end the workflow (NO in step S909), the processing returns to step S904. On the other hand, if the action is determined to be to end the workflow (YES in step S909), the processing of the workflow illustrated in FIG. 9 ends.

According to such information processing, the scan execution button is automatically generated on the MFP 101 at the timing of execution of the scan processing in the workflow. Since the scan execution button is displayed only when needed, the user's trouble in finding the scan execution button is reduced. When the scan execution processing by the user is needed in the workflow, the user is notified of it at that timing by email. This can prevent a delay of execution of the workflow due to a wait for user processing.

The user's operability of the MFP 101 can thus be improved in executing a workflow that involves the user's manual operation such as the scan execution processing the MFP 101.

(Modification 1)

After instructing the MFP 101 to generate the scan execution button, the WF engine 600 may obtain position information about the generated scan execution button on the operation screen. The position information about the scan execution button on the operation screen can be notified to the user so that the user can select the generated scan execution button without confusion FIG. 10 is a sequence diagram illustrating a flow of processing performed by the apparatuses in the entire system illustrated in FIG. 1 when the WF engine 600 executes the workflow illustrated in FIG. 5. The processing of steps S1001 to S1021 is similar to that of steps S601 to S621 in FIG. 6.

In step S1022, the MFP 101, after generating the scan execution button in step S1021, sends back the position information about the generated scan execution button on the operation screen to the WF engine 600. The position information may be any position information that can identify the generated scan execution button on the operation screen. For example, in the case of the button 802 illustrated in FIG. 8, text-based position information such as "The second row from the top. Th left end. Button name: Purchase application." may be used. The screen 801 illustrated in FIG. 8 may be captured, and its image data and text data, such as a button name for identifying the button 802, may be used instead of text alone. The processing of step S1022 is an example of processing for transmitting position information.

In step S1023, the WF engine 600, having received the position information about the generated scan execution button from the MFP 101 in step S1022, transmits an email (processing request mail) for giving an instruction to execute scan and transmission on the MFP 101 to the applicant user along with the received position information. If the position information about the scan execution button, received in step S1022 is text information, the WF engine 600 adds the position information to the main body of the email as button information. If he received position information about the scan execution button is an image file of a screen capture image, the WF engine 600 transmits the email with the image file attached. The image file of the screen capture image is an example of screen data.

The user receives the processing request mail transmitted by the WF engine 600 in step S1023, and inputs authentication information into the MFP 101 for login. Examples of the authentication information include a user ID and password. In step S1024, the MFP 101 receives the authentication information and performs authentication processing similar to that performed by the WF engine 600. The processing of step S1024 is similar to that of step S623 of FIG. 6.

The processing of the subsequent steps S1025 to S1033 is similar to that of steps S624 to S632 in FIG. 6.

In such a manner, the position of the scan execution button generated by the WF engine 600 on the MFP 101 is notified to the user by email.

The scan execution button generated by the WF engine 600 is usually generated at a position next to that of the last button on the screen. However, in a case where a previously generated button has been deleted for some reason, or another button has been generated at the last position, the scan execution button may not be generated at the last position. This might increase the user's trouble in finding the scan execution button generated on the operation screen of the MFP 101.

However, as described above, the position of the scan execution button generated on the operation screen of the MFP 101 is notified to the user in advance. This reduces the trouble in finding the button for executing the workflow even if a large number of buttons for operating the MFP 101 that are irrelevant to the button for executing the workflow are generated on the operation screen of the MFP 101. Errors such as pressing of a wrong button can also be prevented to improve the operability of user operations in executing the workflow.

Figure 11:
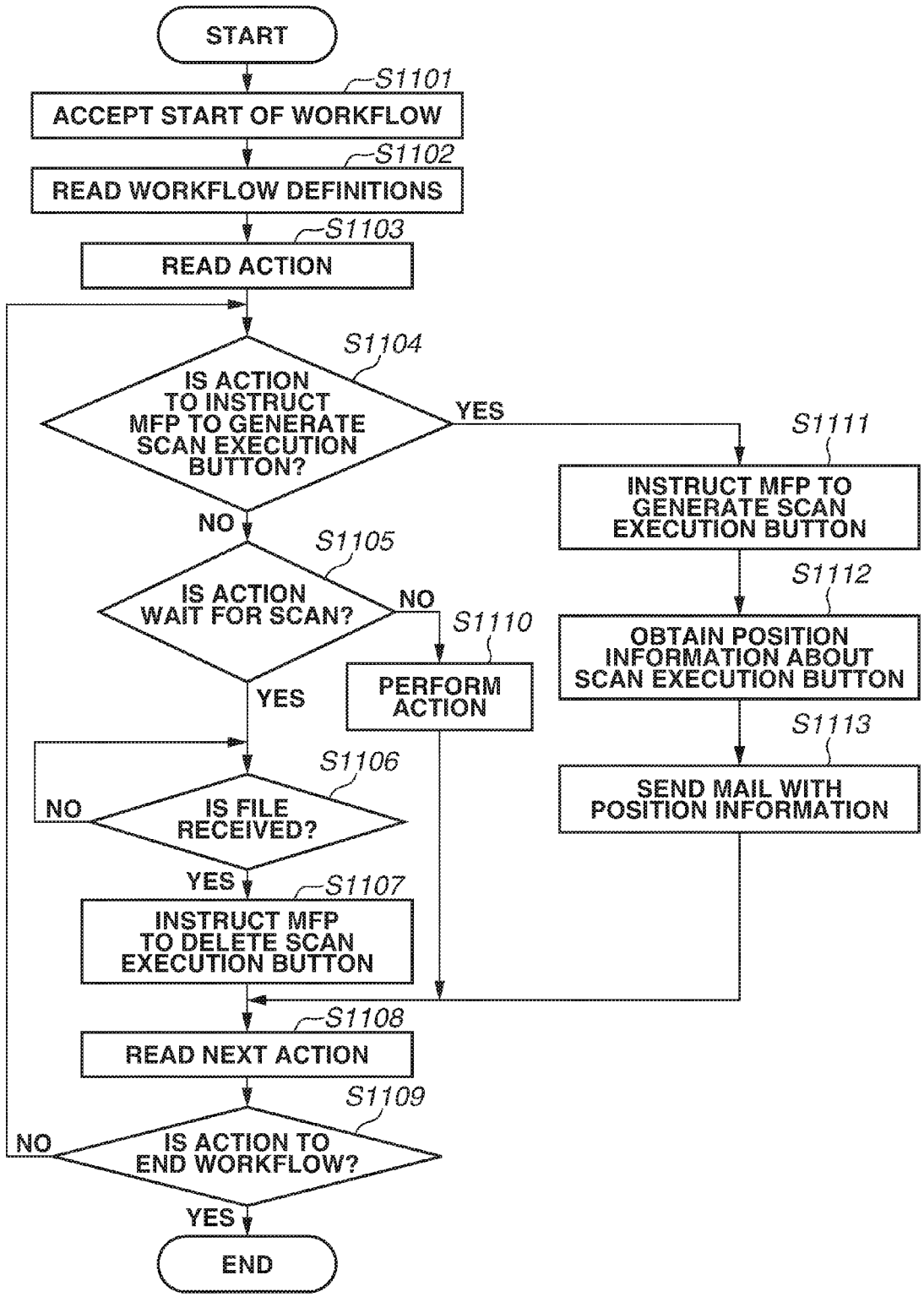
FIG. 11 is a flowchart illustrating an example of the information processing by the WF engine according to one embodiment.

FIG. 11 is a flowchart illustrating an example of the information processing of the WF engine 600.

The processing of steps S1101 to S1111 in F 11 is similar to that of steps S901 to S911 of FIG. 9.

In step S1111, the WF engine 600 instructs the MFP 101 to generate a scan execution button. In step S1112, the WF engine 600 obtains the position information about the generated scan execution button from the MFP 101.

In step S1113, the WF engine 600 transmits an email for giving an instruction to execute a scan to the user, i.e., the applicant, along with the obtained position information about the scan execution button. Here, the WF engine 600 adds the position information about the scan execution button, obtained from the MFP 101 in step S1112, to the email.

The processing then proceeds to step S1108. The processing of step S1108 and subsequent steps is similar to that of step S908 and subsequent steps in FIG. 9.

According to the present modification, the scan execution button is automatically generated on the MFP 101 at timing when the scan processing of the workflow is executed. When the user needs to execute the scan processing in the workflow, the user is notified of it at that timing by email. In addition, the notification to the user includes the position information about the scan execution button on the operation screen. The user can thus easily execute the processing without the trouble in finding the scan execution button on the MFP 101.

In such a manner, the user's operability of the MFP 101 improves in execution of a workflow that includes the user's manual operations such as the execution of the scan processing on the MFP 101.

While various embodiments have been described in detail above, these embodiments are not meant to be limiting. In the foregoing description of various embodiments, the WF engine 600 is described as being implemented on a server. However, the WF engine 600 may also be implemented on one of MFPs that manages workflows in a centralized manner. The hardware configuration of the MFP 101 is not limited to that illustrated in FIG. 2. The MFP 101 may include a plurality of CPUs 201 and/or a plurality of I/Fs 207.

According to the processing of the foregoing various embodiments, a technique for improving operability related to selection of an operation instruction object associated with a workflow and reducing pressing of a wrong operation instruction object can be provided, for example.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-004566, filed Jan. 13, 2016, which is hereby incorporated by reference herein in its entirety.

What is claimed is:

1. An image processing apparatus comprising:
at least one memory device that stores a set of instructions; and
at least one processor that executes the instructions to perform a process comprising:
receiving, from a workflow server, a generation instruction for an operation instruction object, wherein the work-flow server transmits the generation instruction to the image processing apparatus in accordance with a predetermined workflow which is stored in the work-flow server and the predetermined workflow defines a sequence of tasks that the image forming apparatus performs;
generating the operation instruction object related to the predetermined workflow based on the generation instruction for the operation instruction object;
displaying the operation instruction object on a display unit; and
performing control to not display the operation instruction object on the display unit based on a received deletion instruction for the operation instruction object.

2. The image processing apparatus according to claim 1, wherein the process further comprises transmitting data generated based on an operation instruction provided via the operation instruction object.

3. The image processing apparatus according to claim 1, wherein the process further comprises transmitting display position information about the operation instruction object displayed on the display unit.

4. The image processing apparatus according to claim 3, wherein the process further comprises transmitting text information representing a position of the operation instruction object displayed on the display unit, as the display position information.

5. The image processing apparatus according to claim 3, wherein the process further comprises transmitting screen data about the operation instruction object displayed on the display unit, as the display position information.

6. The image processing apparatus according to claim 3, wherein the process further comprises transmitting the display position information to an information processing apparatus.

7. The image processing apparatus according to claim 2, wherein the process further comprises:
generating the operation instruction object based on the generation instruction received from an information processing apparatus;
transmitting the data to the information processing apparatus; and
performing control to not display the operation instruction object on the display unit based on the deletion instruction received from the information processing apparatus.

8. The image processing apparatus according to claim 1, wherein the operation instruction object is a scan execution button.

9. A system comprising:
at least one memory device that stores a set of instructions; and
at least one processor that executes the instructions to perform a process comprising:
receiving, from a workflow server, a generation instruction for an operation instruction object, wherein the work-flow server transmits the generation instruction to the image processing apparatus in accordance with a predetermined workflow which is stored in the workflow server and the predetermined workflow defines a sequence of tasks that the image forming apparatus performs;

generating the operation instruction object related to the predetermined workflow based on the generation instruction for the operation instruction object;

displaying the operation instruction object on a display unit of an image processing apparatus;

transmitting a message that prompts a user to enter an operation instruction via the operation instruction object; and performing control to not display the operation instruction object on the display unit based on a received deletion instruction for the operation instruction object.

10. The system according to claim 9, wherein the process further comprises transmitting display position information about the operation instruction object displayed on the display unit to the user along with the message.

11. The system according to claim 10, wherein the process further comprises transmitting text information representing a position of the operation instruction object displayed on the display unit, as the display position information.

12. The system according to claim 10, wherein the process further comprises transmitting screen data about the operation instruction object displayed on the display unit, as the display position information.

13. An information processing method executed by an image processing apparatus, the information processing method comprising:

receiving, from a workflow server, a generation instruction for an operation instruction object, wherein the work-flow server transmits the generation instruction to the image processing apparatus in accordance with a predetermined workflow which is stored in the workflow server and the predetermined workflow defines a sequence of tasks that the image forming apparatus performs;

generating the operation instruction object related to the predetermined workflow based on the generation instruction for the operation instruction object;

displaying the operation instruction object on a display unit; and performing control to not display the operation instruction object on the display unit based on a received deletion instruction for the operation instruction object.

14. A non-transitory computer readable storage medium storing a program that, when executed, causes an image processing apparatus to perform a process, the process comprising:

receiving, from a workflow server, a generation instruction for an operation instruction object, wherein the work-flow server transmits the generation instruction to the image processing apparatus in accordance with a predetermined workflow which is stored in the work-flow server and the predetermined workflow defines a sequence of tasks that the image forming apparatus performs;

generating the operation instruction object related to the predetermined workflow based on the generation instruction for the operation instruction object;

displaying the operation instruction object on a display unit; and performing control to not display the operation instruction object on the display unit based on a received deletion instruction for the operation instruction object.

* * * * *